US009471609B2

(12) United States Patent
Kienzle

(10) Patent No.: US 9,471,609 B2
(45) Date of Patent: Oct. 18, 2016

(54) DATA CLEANSING TOOL WITH NEW CLEANSING TREE

(71) Applicant: SAP SE, Walldorf (DE)

(72) Inventor: Matthias Kienzle, Mannheim (DE)

(73) Assignee: SAP SE, Walldorf (DE)

( * ) Notice: Subject to any disclaimer, the term of this patent is extended or adjusted under 35 U.S.C. 154(b) by 159 days.

(21) Appl. No.: 14/231,271

(22) Filed: Mar. 31, 2014

(65) Prior Publication Data

US 2015/0278258 A1    Oct. 1, 2015

(51) Int. Cl.
*G06F 7/00* (2006.01)
*G06F 17/00* (2006.01)
*G06F 17/30* (2006.01)
*G06F 3/0484* (2013.01)

(52) U.S. Cl.
CPC ....... *G06F 17/30303* (2013.01); *G06F 3/0484* (2013.01)

(58) Field of Classification Search
CPC .................. G06F 17/30156; G06F 17/30303; G06F 17/30371; G06F 17/30159; G06F 11/1453
USPC ....................................................... 707/692
See application file for complete search history.

(56) References Cited

U.S. PATENT DOCUMENTS

| 2010/0115446 | A1* | 5/2010 | Fastabend | G06F 9/4443 715/772 |
| 2011/0153562 | A1* | 6/2011 | Howard | G06F 17/30581 707/620 |
| 2012/0047179 | A1* | 2/2012 | Faruquie | G06F 17/30961 707/797 |
| 2013/0265334 | A1* | 10/2013 | Brookhart | G06F 3/04812 345/672 |
| 2013/0326427 | A1* | 12/2013 | Elias | G06F 9/4443 715/854 |

* cited by examiner

*Primary Examiner* — Hosain Alam
*Assistant Examiner* — Nicholas Allen
(74) *Attorney, Agent, or Firm* — Jones Day

(57) ABSTRACT

A system and method of de-duplicating data using a graphical user interface application. The graphical user interface application represents a model of the selected data records in a data tree. The graphical user interface application processes a selected target data record and potential duplicates data records. Nodes representing the potential duplicate data records can be added to the target data record. Nodes representing the potential duplicate data records can also be dragged and dropped into a node of the target data record. Nodes from the target data record can also be removed from the target data record. Differences between data associated with multiple nodes can be graphically presented with the graphical user interface application when multiple nodes are selected. Changes made to the data tree in the graphical user interface are applied to data records stored in a database.

41 Claims, 13 Drawing Sheets

Populating Data Cleansing Tree

Modifying Data in the Data Cleansing Tree

Merging and Removing Data with the "Keep" flag

Merging Data with Drag & Drop

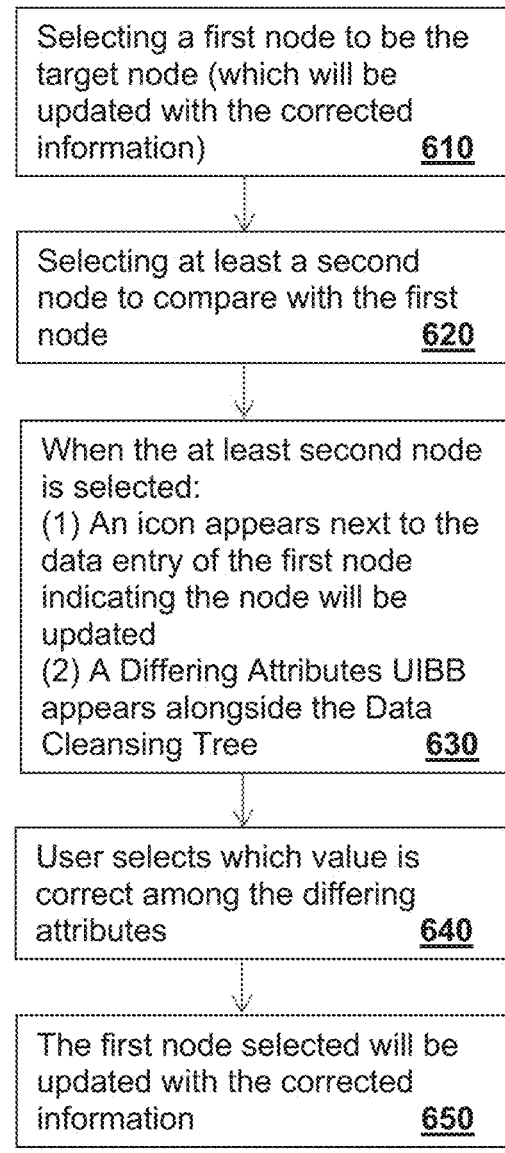

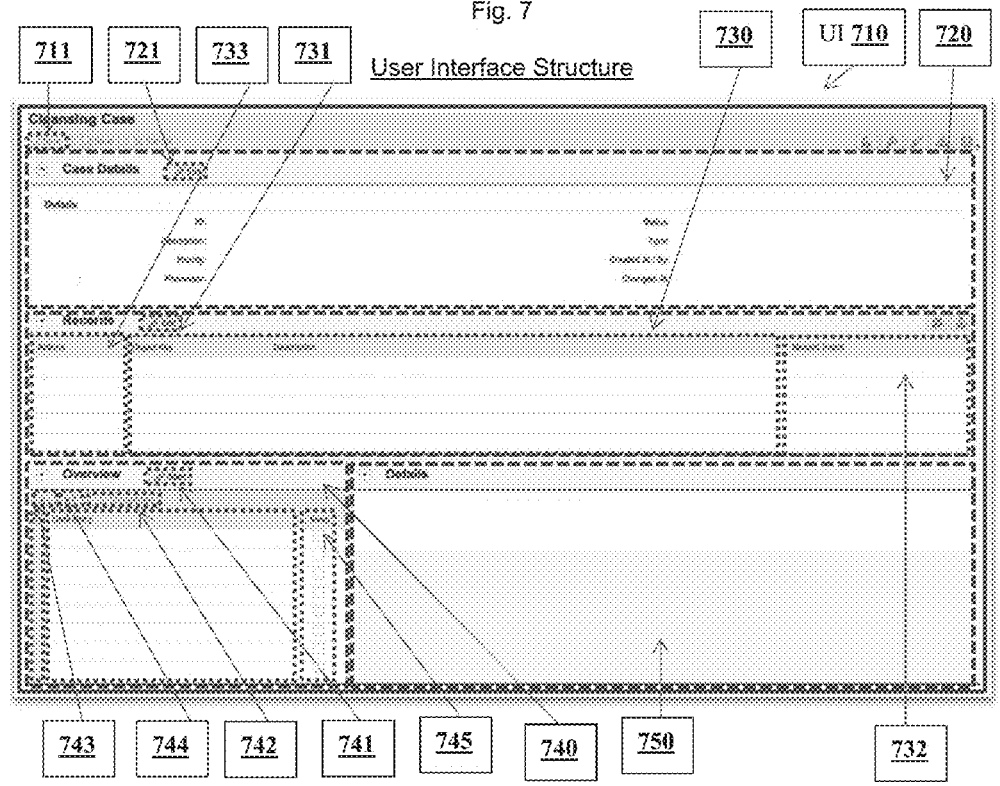

DATA CLEANSING TOOL WITH NEW CLEANSING TREE

FIELD

The present disclosure relates generally to the de-duplication of data using a graphical user interface application. More particularly, the present disclosure relates to systems and methods for de-duplicating data using a data cleansing tree.

BACKGROUND

Data de-duplication is used to eliminate duplicative data. Currently, users are able to de-duplicate data utilizing a "side-by-side" approach. However, there are many drawbacks to the "side-by-side" approach. For example, the user interface of the "side-by-side" approach becomes increasingly inefficient and time-consuming as the complexity and size of the data sets increases. For example, first, the data populates a multi-column list (each data set populates one column), then the user searches for the specific data sets to compare, and lastly, using the "side-by-side" approach, the user compares the data. However, the user is limited to comparing and processing only two data at a time.

SUMMARY

Systems and methods of the present invention provide for a user interface which enables an end user to modify, merge, copy and consolidate data records among a variety of data sets. In an embodiment, a method providing for a user interface which enables an end user to modify, merge, copy or consolidate data records among a variety of data sets utilizes a data cleansing tree. In an embodiment, an end user populates the data tree with a model of the desired data sets to be processed. The data tree is hierarchical. Each data record is represented by a single line (a node of the tree). The single line is a depiction of its contained data and is user readable. The details of the node are viewable when the node is selected. The details are displayed in a user readable block alongside the data tree. In an embodiment, the visual representation of the details of the data set is capable of a nearly unrestricted 1:1 reuse of the data set as it is displayed, maintained and validated within the usual maintenance application ("single object maintenance"). The same user interface application or "user interface building block" ("UIBB") utilized to input the data during usual maintenance is also used to modify the data in the cleansing details. Thus, each detail will be presented ("data visualization") to the user as it was previously presented to the user when the UIBB was utilized to input or otherwise manage the data.

In an embodiment, the user interface of the present disclosure allows a user or system to merge data records from one data set to another data set. The data tree includes a "target record" functionality, which designates which data set will be the subject of modification. For example, only the target record data set is modified. The other data sets included in the data tree model are not modified. For example, if a selected data node does not belong to the data set currently specified as the target record, it will not be kept as the surviving data. In an embodiment, the user interface of the present disclosure includes a "Keep" functionality, which designates which data record will be copied or merged to the target record data set. For example, the "Keep" functionality does not move the data record from one data set to another data set, but rather makes a copy of the data record and includes the "kept" data record with the surviving target record. In another embodiment, by "keeping" a data record, two things happen: (1) all the fields associated with the data record in the UIBB in the details section turn from read-only to editable and (2) every intrinsic validity check runs (e.g., validity checks are run to avoid doubled entries, but can also be used for checking data correctness). Similarly, a data record that was previously "kept" and becomes "un-kept" is removed from the surviving target record. Further, in an embodiment, all the fields in the UIBB in the details section, associated with the "un-kept" data record, turn from editable to read-only.

In an embodiment, the user interface of the present disclosure allows you to drag & drop data in the data tree model. According to an embodiment, the end user is able to drag a data record from a source node and drop that data record into a target node. Dragging a data record from a source node to a target node does not remove the dragged data record from its original data set, but, rather, creates a copy of the dragged data and includes the dropped data under the target node with the surviving target record. A data record can be dragged and dropped into a target node with the same properties as the source node. For example, a data record representing a phone number can be dragged to another data node containing phone numbers. In another embodiment, a data record can be dragged and dropped to a target node with similar properties as the source node. For example, a data record representing a phone number can be dragged to another data node containing fax numbers. Further, in an embodiment, the phone number in the dropped data will be automatically converted into a fax number.

In an embodiment, the user interface of the present disclosure provides for a method of automatically comparing two or more data records, wherein the differing attributes between those two or more data records are displayed automatically in a UIBB alongside the data tree. The differing attributes UIBB displays which attributes are different and the value of those attributes. Further, if there are no differences, the differing attributes UIBB displays an indication of such. In an embodiment, an end user may update a target data record with the value of one of the differing attributes. The data tree provides for a method of selecting the target data record as well as the multiple data records to compare it with. A symbol next to the data node selected by the end user as the target data record will indicate to the end user which data record will be updated. The symbol appears only for the first data node selected in the data tree for automatic comparison, the data nodes selected afterwards will be used for comparison. The data nodes not selected as the target data record will not be updated.

In an embodiment, a developer modifies the parameters of the data cleansing tree with a cleansing agent. The cleansing agent is an interface which allows the developer to influence the visibility and representation of everything that comes to the depiction of the data cleansing tree (e.g., representation of which nodes appear, representation of data associated with a node, representation of a node's relationship to another node, interaction of nodes). For example, utilizing the cleansing agent, it can be established which nodes can be dragged and dropped into other nodes. Further, in an embodiment, with the cleansing agent, the developer can predetermine which nodes can and cannot be kept, deleted, modified, etc. Once the developer establishes certain parameters, the end user will not be able to change those parameters. However, the end user will continue to be influenced by the parameters established with the cleansing agent. If desired, the developer is able to modify the parameters of the data cleansing tree again with the cleansing agent. In an embodiment, with the cleansing agent, the developer is able to represent a variety of data uniquely and in a non-generic way. This allows for a more efficient, secure, and easier-to-use data cleansing tree.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

FIG. 6 illustrates a method of merging data in the data cleansing tree with automated comparison.

FIG. 7 illustrates an embodiment of the user interface.

DETAILED DESCRIPTION

Figure 1:
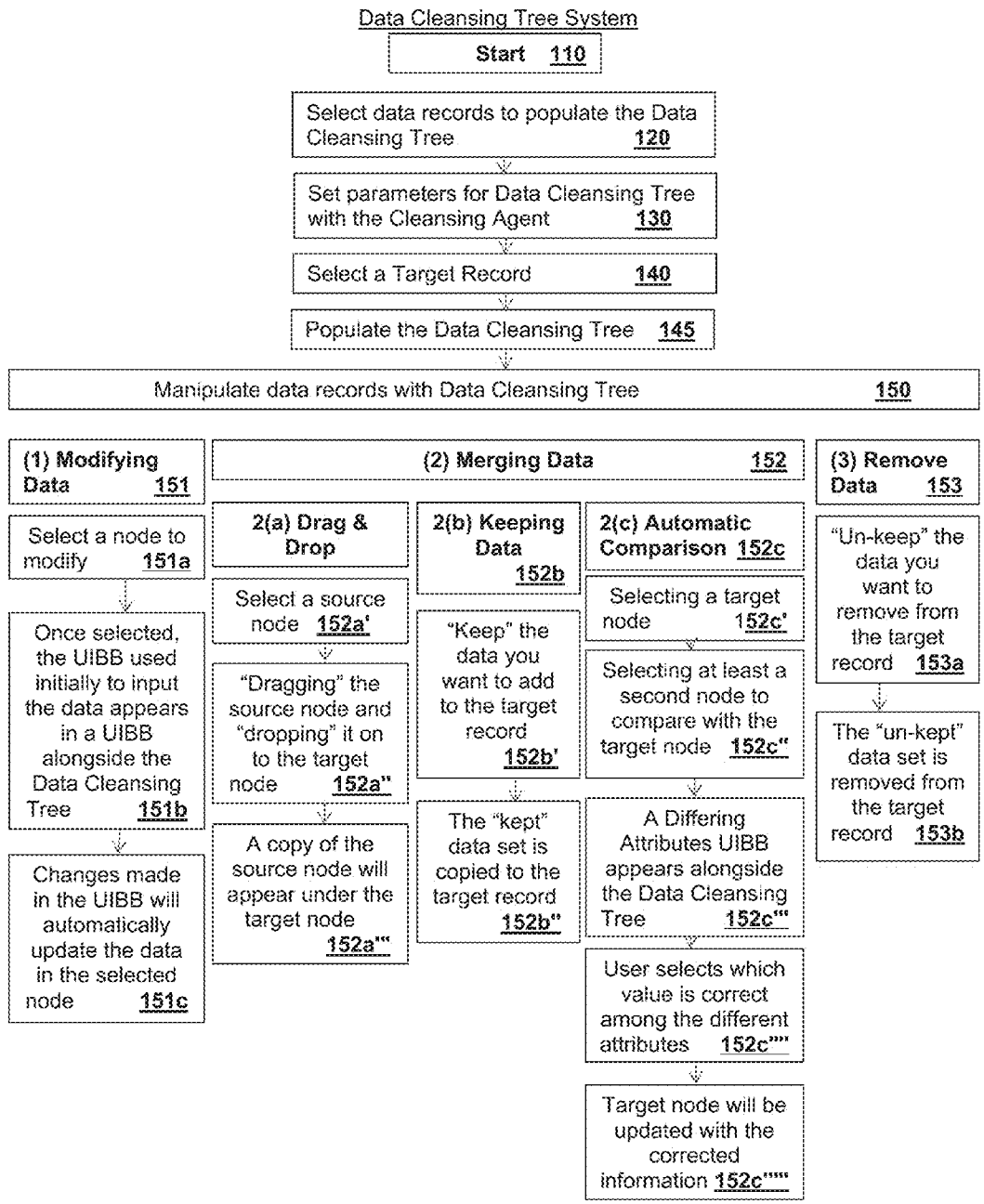
FIG. 1 illustrates the overall functionality of the user interface.

FIG. 1 is a representation of the overall functionality of the user interface for the data cleansing tree. Step 110 represents the start of the process. In step 120, the end user selects the data records to populate the data cleansing tree. In step 130, the end user sets the parameters for the data cleansing tree with the cleansing agent. In step 140, the end user has to select a target record. In step 145, the data tree of the data cleansing tree is populated with the data records to be processed. With the data tree populated, the end user is able manipulate the data records with the data cleansing tree in step 150. For example, in step 151, the end user is able to modify the data within each of the individual nodes in the data cleansing tree. To do this, the end user has to first select a node to modify in step 151*a*. Once a node is selected, in step 151*b*, the UIBB used to initially input the data appears alongside the data cleansing tree. Thus, in step 151*c*, the end user is able to modify the values associated with the data node with the UIBB. Changes made in the UIBB will automatically update the values of the data in the data node. The end user is also able to merge data from one data record to another data record with the data cleansing tree. For example, in step 152*a*, the end user is able to drag and drop a data node from a source node to a target node. To do this, the end user has to first select a source node in step 152*a*'. Once a node is selected, the end user has to drag the source node and drop onto a target node in step 152*a*''. After the source node is dropped on to the target node, a copy of the source node will appear under the target node in step 153*a*'''. Further, in step 152*b*, the end user is also able to merge data by keeping data that's not originally part of the target record. In step 152*b*' the user has to select which data he wants to keep by activating the "Keep" flag of a certain node. Once the "Keep" flag is activated, in step 152*b*'', the "kept" data node is copied to the target record. The end user is also able to merge data through the automatic comparison functionality in step 152*c*. To do this, the end user has to first select a target node in step 152*c*'. Then, in step 152*c*'', the end user has to select at least a second node to compare with the target node. In an embodiment, the end user can compare only two nodes, or even 3 or more nodes. Once the target node and the node(s) to compare with the target are selected, a differing attributes UIBB appears alongside the data cleansing tree in step 152*c*'''. In step 153*c*'''', the end user selects which value is correct among the different attributes. Then, in step 153*c*, after the user selects the correct value, the target node is automatically updated with the corrected information. The end user is also able to remove data from the target record as depicted in step 153. To do this, in step 153*a*, the end user deactivates the "Keep" flag of any nodes already "kept" with the target record. Once the "Keep" flag is deactivated, in step 153*b*, the "un-kept" data set is removed from the target record.

Figure 2:
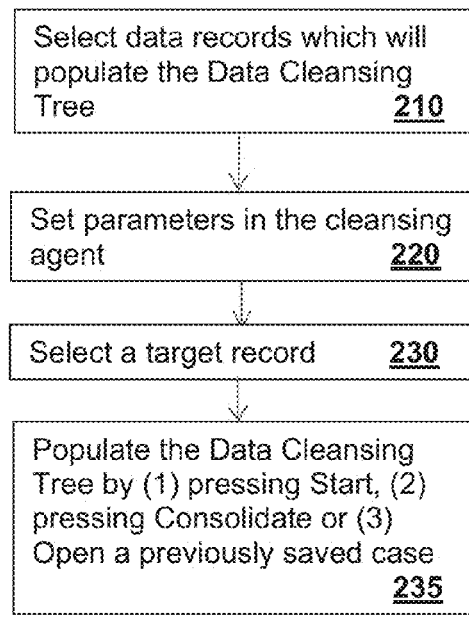
FIG. 2 illustrates a method of populating the data cleansing tree.

FIG. 2 illustrates an embodiment involving a method of populating the data cleansing tree. In step 210, the end user selects which data records will populate the data cleansing tree. In step 220, the end user sets the parameters for the data cleansing tree in the cleansing agent. In an embodiment, the cleansing agent can be also used or modified before the end user populates the data cleansing tree. In another embodiment, the cleansing agent can also be used before the end user even initializes a new cleansing case. With the cleansing agent, the end user is able to determine what type of information will populate the branch and leaf nodes of the data tree as well as which nodes can be dragged and dropped, kept, deleted, modified, etc. After a target record is selected, as depicted by step 230, the data cleansing tree can be populated. The data cleansing tree can be populated, as depicted by step 235, by (1) pressing the Start button as depicted in FIG. 7, (2) pressing the Consolidate button as depicted in FIG. 7 and (3) opening a previously saved case with the user interface in FIG. 7.

Figure 3:
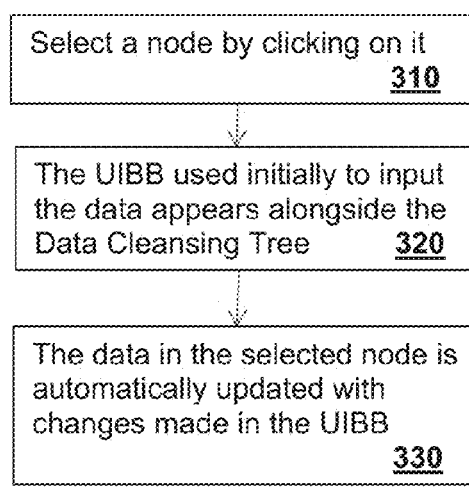
FIG. 3 illustrates a method of modifying data associated with a node in the data cleansing tree.

FIG. 3 illustrates a method of modifying the data associated with the nodes in the data cleansing tree. To modify data associated with a node, in step 310, an end user has to first select a node. Once the node is selected, in step 320, the UIBB used to initially input the data appears alongside the data tree. In step 330, the data in the selected node is automatically updated with changes made with the UIBB.

Figure 4:
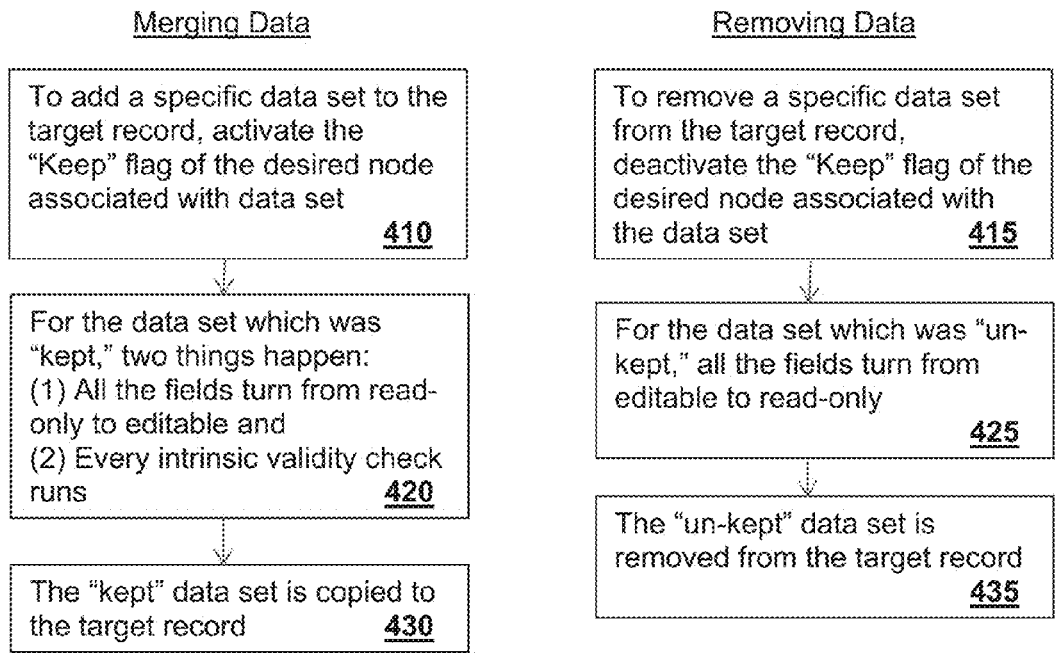
FIG. 4 illustrates a method of merging and removing data in the data cleansing tree with the "Keep" flag.

FIG. 4 illustrates a method of merging and removing data with the "Keep" flag. To "keep" data with the target record, in step 410, the end user activates the "Keep" flag of the desired node associated with the data set. In step 420, after a data node is "kept," two things happen: (1) all the fields in the UIBB in the details section alongside the data tree, associated with the "kept" node, turn from read-only to editable and (2) every intrinsic validity check runs. Validity checks are run to avoid doubled entries, but can also be used for checking data correctness. Next, in step 430, the "kept"

data node is copied to the target record. Likewise, to "un-keep" data from the target record, in step 415, the end user deactivates the "Keep" flag of an already "kept" desired node associated with the data set. In step 425, after the data node is "un-kept," all the fields in the UIBB in the details section, associated with the "un-kept" node, turn from editable to read-only. In step 435, the "un-kept" data node is removed from the target record.

Figure 5:
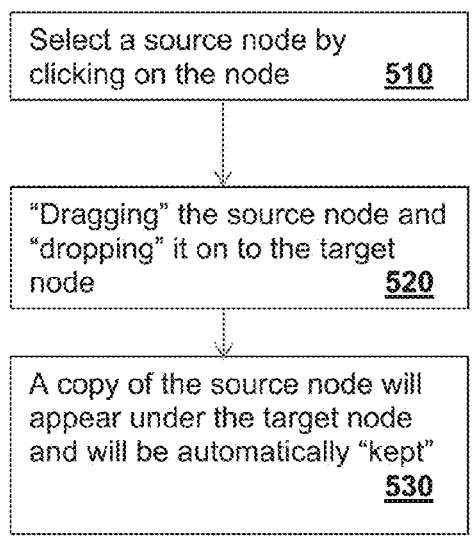
FIG. 5 illustrates a method of merging data in the data cleansing tree with drag & drop.

FIG. 5 illustrates a method of merging data with drag and drop. In step 510, the end user selects a source node by clicking on the node. In step 520, the end user drags the source node and drops it into the target node. After the node is dropped, in step 530, a copy of the source node will appear under the target node and will be automatically "kept" with the target record. In another embodiment, the dropped node is not automatically "kept," and the end user can "keep" the node manually. In an embodiment, if the original source node belonged to a record not designated as the target record, the original source node will still remain with that record and will not be deleted.

FIG. 6 illustrates a method of merging data with automated comparison. In step 610, the end user selects a first node to be the target node. The first node selected will be the one which will be updated with the corrected information. Then, in step 620, the end user selects at least a second node to compare with the first node. After the end user selects the second node, the end user will see two nodes selected. Further, the end user is not limited to comparing only two nodes and is able to select as many nodes as desired as long as at least two nodes are selected. In step 630, when the at least second node is selected, two things occur: (1) a visual indicator appears next to the first node selected (this indicator acts as a way of notifying the end user of which node, of the multiple selected, will be updated after merging using automatic comparison); and (2) A differing attributes UIBB appears alongside the data cleansing tree. The differing attributes UIBB depicts which attributes are different and the value of those attributes. In an embodiment, if there are no differences, the differing attributes UIBB will display an indication of such. In step 640, the end user selects which value is correct among the differing attributes. In step 650, the first node selected will be updated with the correct value the end user selected in step 640.

FIG. 7 illustrates an embodiment of the user interface. In an embodiment, the end user is able to process data cleansing with the use of a cleansing case user interface or UI 710. The cleansing case UI 710 includes a cleansing case details section 720. The cleansing case details section 720 depicts case details describing the instant cleansing case such as information regarding the identification number of the cleansing case, a short description, the priority of the cleansing case, the name of the end user who processed the case, when the cleansing case was created, etc. The end user is able to modify the case details with the use of the cleansing case details edit button 721. When the cleansing case details edit button 721 is clicked, the cleansing case details UIBB becomes editable, allowing the end user to modify and update the cleansing case details. In an embodiment, the case details of the cleansing case are modifiable before and after the data cleansing tree is populated. In another embodiment, the end user is able to modify the case details of the cleansing case only before the data cleansing tree is populated.

An embodiment of the cleansing case UI 710 also includes a cleansing case data records section 730. The cleansing case data records section 730 depicts which data records are involved in the cleansing case. For example, the cleansing case data records section 730 depicts which record is designated as the target record and which records are designated as the potential duplicate records with the record intent column 732. Further, using the record intent column 732, the end user is able to designate which record is the target record and which are potential duplicates. In an embodiment, the record intent of each record is initially designated as a "Potential Duplicate." The end user is able to designate which record is the target record by changing the value of the record in the record intent column 732 from "Potential Duplicate" to "Target Record." In an embodiment, the values in the record intent column are selectable through a drop down menu. Further, additional data records can be added to and current data records can be removed from the cleansing case data records section 730 with the cleansing case data records edit button 731. However, in an embodiment, data records can no longer be added once the data cleansing tree is populated. The cleansing case data records section 730 also contains a short line description as well as the object key of the data record involved in the cleansing case. Further, in addition to using button 731 and column 732 to modify the data records, the end user is able to remove data records marked potential duplicates from the data records involved in the cleansing case with Actions column 733 located in section 730. In addition to adding data records with the UI 710, it is also possible to select data records in an integrated development environment (IDE) or a foreign application which then calls UI 710 to utilize the data cleansing tree.

An embodiment of the UI 710 also includes an overview section 740. Overview section 740 contains the data cleansing tree. The data cleansing tree is a model of the data records to be cleansed. Each data set of the data records involved is represented by a single line on a node of the data cleansing tree. The nodes of the data cleansing tree are selectable by the end user. Each node is a parent, child or sibling of another node. The end user can select a node by clicking on the node of the tree. To select multiple nodes, the end user can utilize a method used by different operating systems to select multiple objects such as holding down the shift-key while selecting the multiple nodes or holding down the shift key after selecting the first node and then selecting the other nodes. In an embodiment, the data cleansing tree is comprised of three columns: (1) a leftmost column which allows the end user to edit modify data associated with that node that provides an alternative means of selecting a node, (2) a middle column which is comprised of the actual data tree model and (3) a rightmost "Keep" flag column 745 which allows the end user to designate which nodes to keep with the target record. The end user selects which nodes to keep and not keep with the target record by checking and unchecking, respectively, the box in the "Keep" flag column 745 alongside the node.

The overview section 740 also includes a start button 741. The start button 741 populates the data cleansing tree with the data records selected by the end user. The overview section 740 also includes a consolidate button 742. Consolidate button 742 consolidates the target record of the data cleansing tree to only those nodes which were kept. In other words, any node with its "Keep" flag checked will be included with the target record in the repopulated data tree. Further, the overview section 740 contains an expand button 743 and collapse button 744, which fully expand or collapse, respectively, every node in the data tree. However, the end user can also expand or collapse individual parent nodes in the data tree by clicking on an expand/collapse arrow associated with the parent nodes. If the arrow is pointing to the right (which means the node is collapsed), then clicking on the arrow will expand the node and cause the arrow to point down. If the arrow is pointing down (which means the node is expanded), then clicking on the arrow will collapse the node and cause the arrow to point to the right.

An embodiment of the UI 710 also includes a details section 750. The details section 750 is populated when at least one node is selected. If one node is selected, all the relevant details of the data set associated with the node are shown in a UIBB in the details section 750. The same UIBB utilized to input the data during usual input and maintenance is also used to modify the data in the cleansing details section 750. Further, if the node is already "kept," once selected, the end user is able to modify the details of the node in the UIBB. Once modified, the details in the node are automatically updated. If the node is not "kept," the details of the node in the UIBB appear as read-only. Further, if the end user selects two or more nodes, a UIBB representing the differing attributes between the selected nodes appears in the details section 750. In an embodiment, if there are no differences between the selected nodes, a message indicating such will be appear in the differing attributes UIBB. On the other hand, if there are differences, with the differing attributes UIBB, the end user is able to select which value is the correct value of the differing attributes. In an embodiment, the end user is able to select the correct value by selecting the appropriate checkbox located alongside the specific differing attribute as the correct value. The first node selected will be the node updated with the correct information from the differing attributes UIBB. The at least second node (and other nodes) will not be updated. In an embodiment, after the at least second node is selected, a symbol appears next to the first node selected as an indicator of which node will be updated with the corrected information. In an embodiment, as mentioned above, to select multiple nodes, the end user can use features present on input devices to select multiple objects. For example, in an embodiment, multiple objects can be selected by holding down the shift key on a keyboard or keypad while selecting the multiple nodes or holding down the shift key after selecting the first node and then selecting the other nodes. In another embodiment, multiple nodes can be selected using gesture-based inputs on devices not including a keyboard or keypad, such as a touch device. In another embodiment, the differing attributes UIBB does not have to automatically appear when the at least second node is selected. For example, the end user could first select the nodes to compare (the first one selected will be the one that will be updated) and then manually initiate a comparison.

In an embodiment, the end user is able to save the changes made to the target record with the data cleansing tree by saving the cleansing case. For example, using the UI 710, the end user is able to save the cleansing case by selecting the save button 711.

Figure 8A:
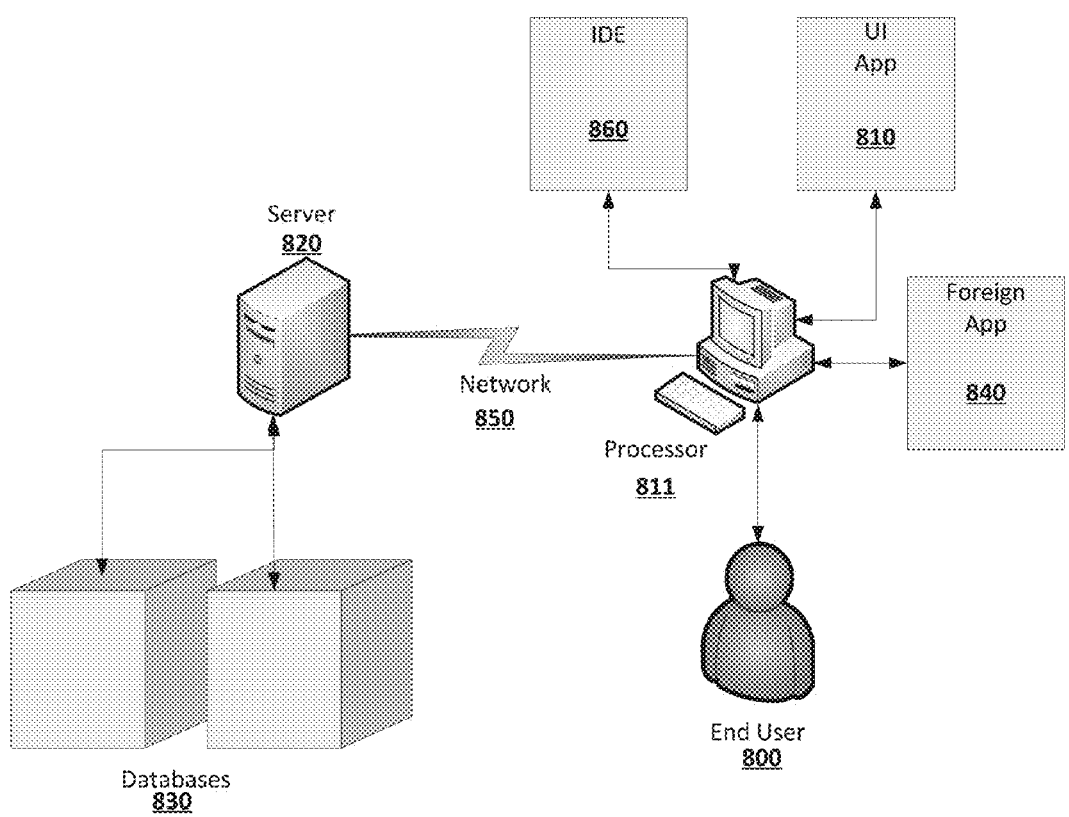
FIG. 8A illustrates a system designed to implement an embodiment of the method.
Figure 8B:
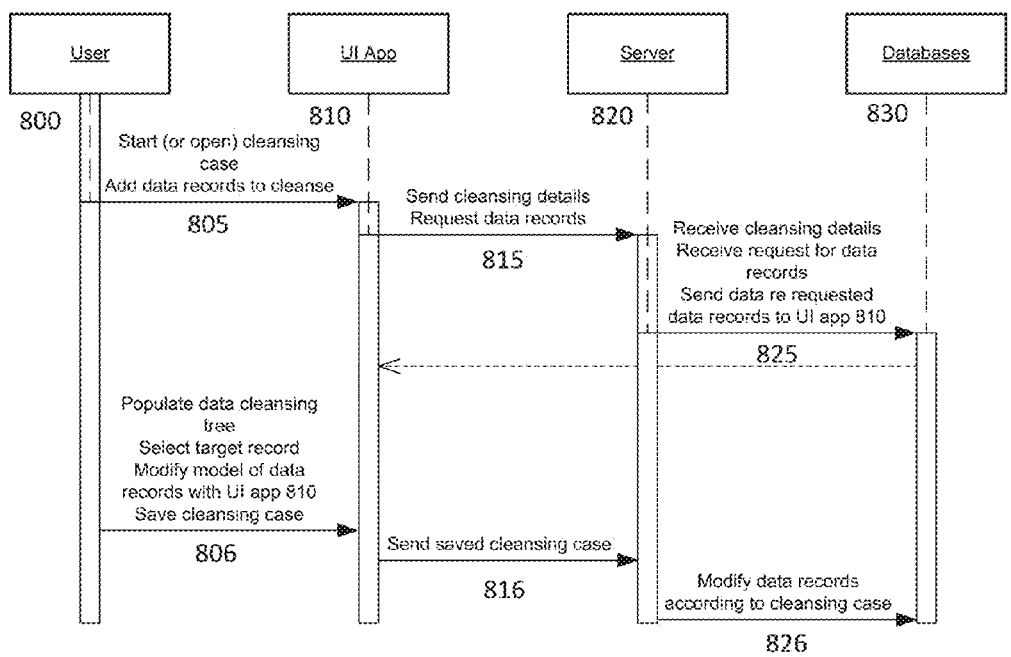
FIG. 8B illustrates an embodiment of the interaction between the elements of the system.

FIG. 8A shows an example system configured to implement the data cleansing method described above. In an embodiment, the system consist of a user 800, a UI app 810 (which is utilized on a processor with a display 811), a server 820 and databases 830. FIG. 8B is an embodiment of the interaction between the elements of the system. The UI app 810 is a graphical user interface application. In an embodiment, the UI app 810 is a webpage that can be accessed via a web browser. In another embodiment, the UI app 810 is an application that can be run on a client-side device. At step 805, the user 800 starts or opens a cleansing case and adds data records to cleanse with UI app 810. At step 815, the UI app 810 sends the cleansing details of the cleansing case and request for data records to the server 820. At step 825, the databases 830 receive the cleansing details and request for data records from server 820 and send data used to form the data cleansing tree model to the UI app 810. In step 806, the user 800 populates the data tree with a model of the requested data records, selects a target record and is now able to manipulate the nodes (and the data associated with the nodes) of the data cleansing tree. When the user 800 is satisfied with the changes made to the data records, the cleansing case could be saved. In step 816, the UI app 810 sends the saved cleansing case to the server 820. Then in step 826, the server 820 modifies the data records in the databases 830 according to the cleansing case. In another embodiment, the cleansing case, after it is saved, remains in memory in the databases 830 and does not modify the data records until it is approved by at least one other user. The at least one other user has role-based rights to review/see/ modify/act. In another embodiment, predetermined instructions performed by the databases 830 automatically determine if and when the data records in the databases 830 are to be modified according to the cleansing case.

Figure 8C:
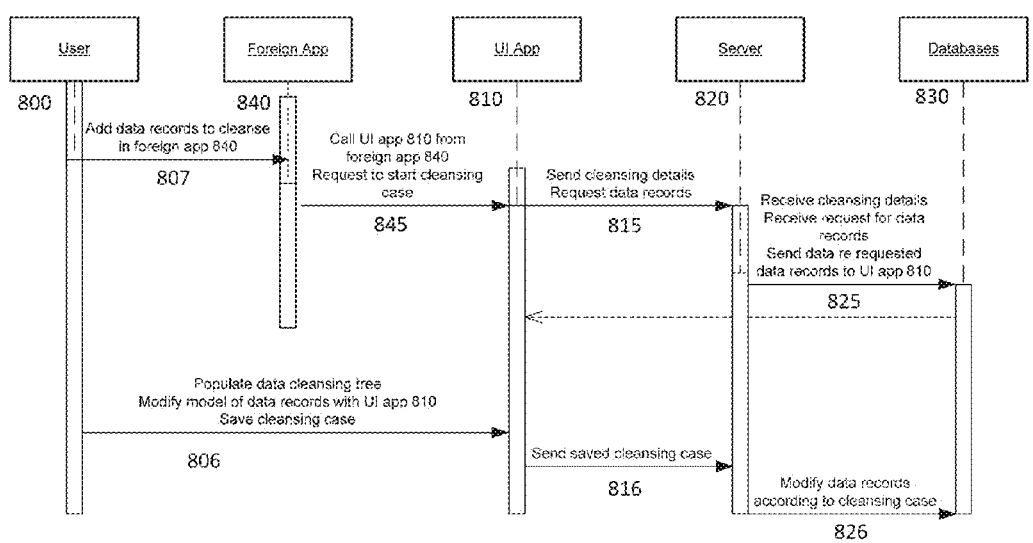
FIG. 8C illustrates an additional embodiment of the interaction between the elements of the system.
Figure 8D:
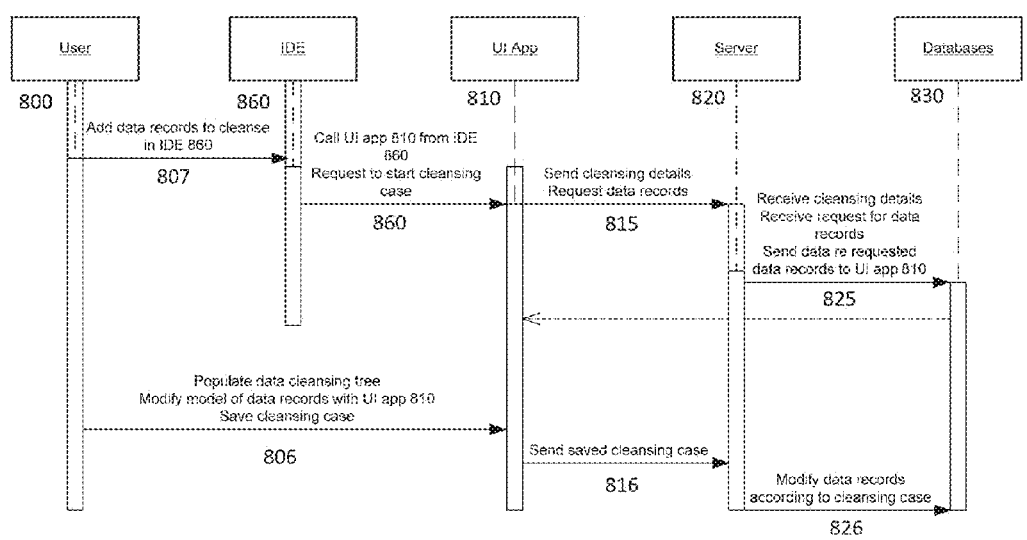
FIG. 8D illustrates an additional embodiment of the interaction between the elements of the system.

FIGS. 8C and 8D show other embodiments of the interaction between the elements of the system. With regard to FIG. 8C, in step 807, the user 800 adds data records to cleanse in a foreign app 840. In step 845, the foreign app 840 calls the UI app 810 to request to start a cleansing case with the data records added in foreign app 840. Other than the aforementioned steps, the following steps follow a similar path as in FIG. 8B. Once the UI app 810 is called and opened, the foreign app 840 no longer plays a role in the process. FIG. 8D is similar to FIG. 8C except that instead of a foreign app 840 an integrated development environment ("IDE") 860 is used.

It should be appreciated that the present invention can be implemented in numerous ways, including as a process, a system, a computer processor executing software instructions, or a computer readable medium such as a computer readable storage medium or a computer network wherein program instructions are sent over optical or electronic communication or nontransitory links. For example, in an embodiment, the processor with a display 811 could be any device including a processor, a display to display the user interface and network connectivity to communicate between the UI app 810 and the databases 830. In an embodiment, the UI app 810 can be accessed on any device including a processor and network connectivity. For example, the UI app 810 can be accessed via touchscreen mobile devices. In an embodiment, network connectivity refers to internet access. In an embodiment, the internet access can be wired or wireless.

The disclosure is also directed to computer program products comprising software stored on any computer useable medium. Such software, when executed in one or more data processing devices, causes data processing device(s) to operate as described herein. Embodiments of the disclosure employ any computer useable or readable medium, known now or in the future.

Examples of computer readable storage media include, but are not limited to: primary and/or secondary devices, magnetic media, such as hard disks, floppy disks, Zip disks, tapes, and magnetic tape; optical media such as Compact Disc Read-Only Memory (CD-ROM) disks, DVDs and holographic devices; magneto-optical media; and hardware devices that are specially configured to store and execute, such as application-specific integrated circuits ("ASICs"), programmable logic devices ("PLDs") and ROM and RAM devices, Microelectromechanical Systems (MEMS), nanotechnological storage device, etc.), and communication mediums (e.g., wired and wireless communications networks, local area networks, wide area networks, intranets, etc.). Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hard-wired circuitry in place of, or in combination with machine readable software instructions.

Figure 9A:
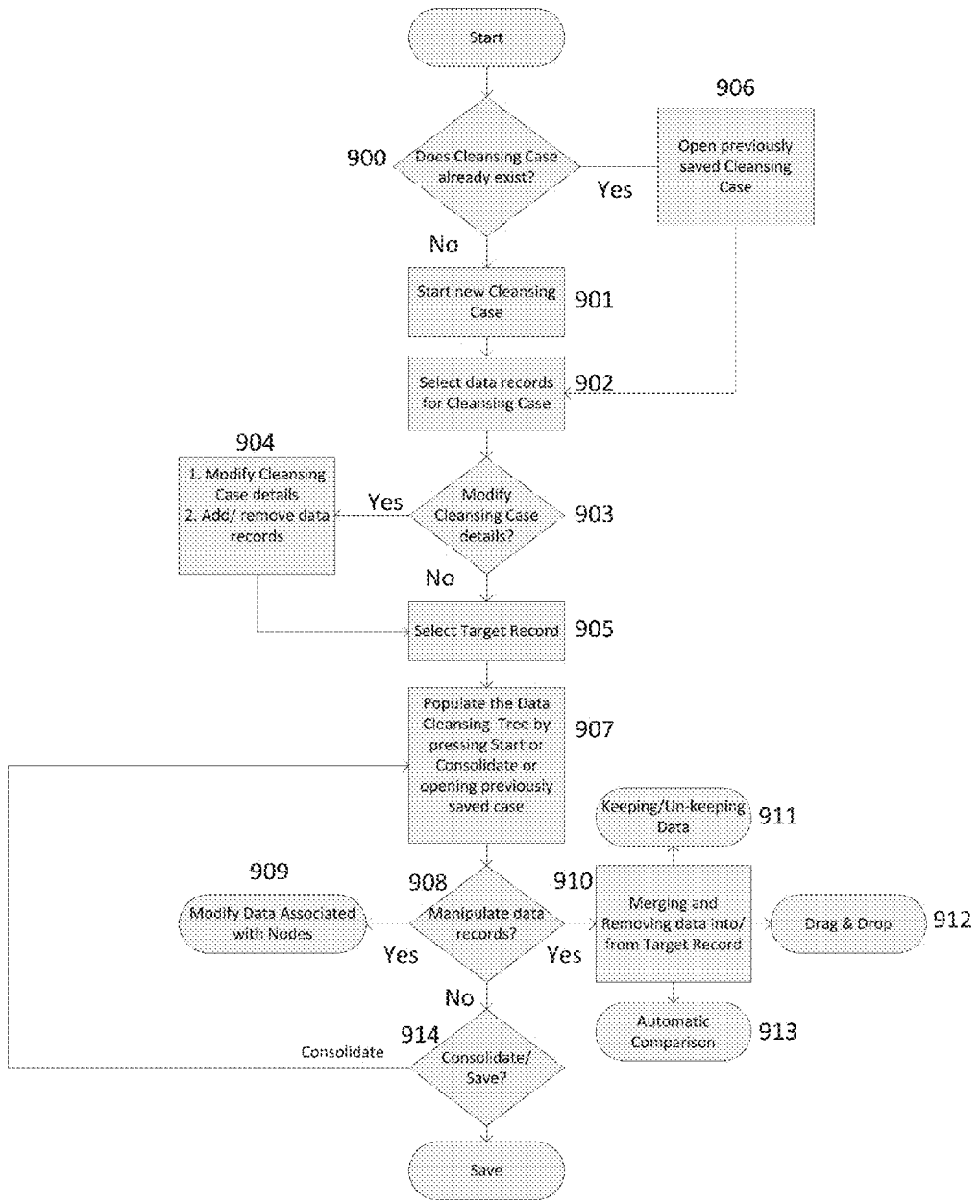
FIG. 9A illustrates a method of utilizing the user interface.

FIG. 9A illustrates a method of utilizing the user interface. The process will be described using the elements of the UI 710 explained in FIG. 7. At step 900, the end user can either open a previously saved cleansing or start a new cleansing case. If the end user selects to open a previously saved case as seen in step 906, the end user then skips to step 902. If the end user selects to start a new cleansing case, a new cleansing case is initialized in step 901. In step 902, the end user selects data records to add to the cleansing case in the cleansing case data records section 730. Data records can be added to and current data records can be removed from the cleansing case data records section 730 with the cleansing case data records edit button 731. In step 903, the end user has the option of modify the cleansing details and to add/remove data records. In step 904, the end user is able to modify the case details with the use of the cleansing case details edit button 721. When the cleansing case details edit button 721 is clicked, the cleansing case details UIBB becomes editable, allowing the end user to modify and update the cleansing case details. Data records can removed using the data records edit button 731 or the Actions column 733 located in section 730. Then, in step 905, the end user selects the target record. The end user is able to designate which record is the target record by changing the value of the record in the record intent column 732 from "Potential Duplicate" to "Target Record." It should be noted that the end user is able to modify the target record and add or remove other records only before the data cleansing tree is populated. In step 907, the data cleansing tree is populated. The data cleansing tree can be populated by pressing either the start button 741 or the consolidate button 742. Further, opening a previously saved case also populates the data cleansing tree. After the data cleansing tree is populated, in step 908 the end user has the option of manipulating the data records associated with the nodes of the data cleansing tree. The end user can either modify the data associated with the nodes, as shown in step 909; merge or remove data into/from a target record, as shown in step 910; or the end user can choose not to manipulate the data records associated with the nodes and instead choose between either consolidating the data cleansing tree or saving the cleansing case as depicted in step 914.

Figure 9B:
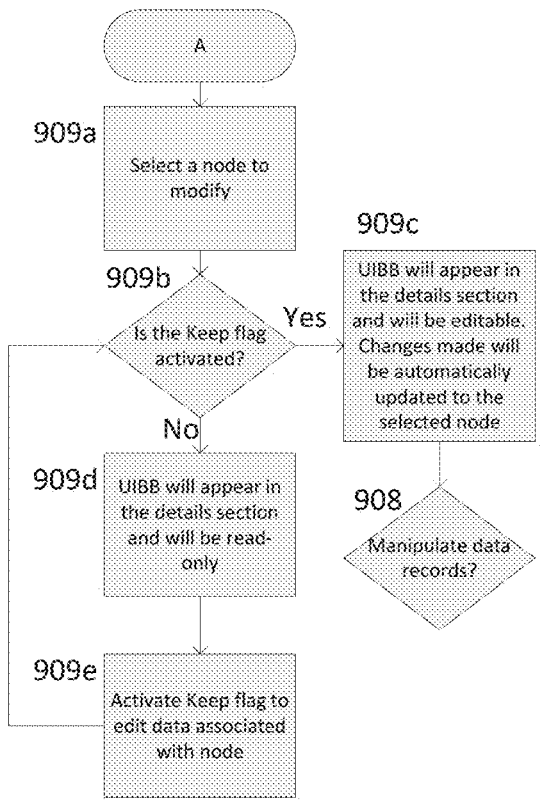
FIG. 9B illustrates a method of modifying data associated with the node using the user interface.

As shown in FIG. 9B, if the end user selects to modify data associated with nodes, in step 909a, the end user must first select a node to modify. The end user can select a node by clicking on the node of the tree. In step 909b, it is determined if the "Keep" flag associated with the selected node is activated. If the "Keep" flag is activated, in step 909c, the UIBB containing the node data will appear in the details section and will be editable. Changes made in the UIBB will be automatically updated to the selected node. If the "Keep" flag is not activated, in step 909d, the UIBB containing the node data will appear in the details section and will be read-only. To edit data associated with the node, the end user has to activate the "Keep" flag, as depicted in step 909e. Once the end user is satisfied with the changes, the end user has the option to continue manipulating the data records, as is depicted by step 908.

Figure 9C:
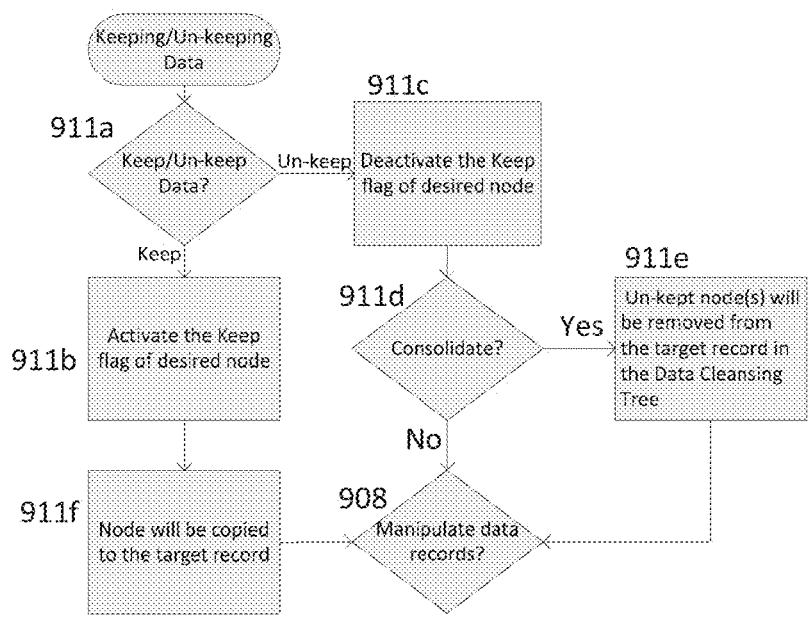
FIG. 9C illustrates a method of keeping and un-keeping data using the user interface.

As shown in FIG. 9C, in step 911, the end user can merge and remove data into and from the target record, respectively, by "keeping" and "un-keeping" data. In step 911a, the end user determines whether or not "keep" or "un-keep" data. To "keep" data, in step 911b, the end user activates the "Keep" flag of the desired node associated with the data set. After a desired node is "kept," the node will be copied to the target record in step 911f. To "un-keep" data, in step 911c, the end user deactivates the "Keep" flag of the desired node associated with the data set. After "un-keeping" data, in step 911d, the end user has the option of consolidating the data cleansing tree. If the data cleansing tree is consolidated, in step 911e, the "un-kept" nodes will be removed from the target record in the data cleansing tree and their removal will be visually apparent in the data cleansing tree. After the end user is done "keeping" nodes, "un-keeping" nodes and/or consolidating the data cleansing tree, the end user then has the option to continue manipulating data records as depicted by step 908.

Figure 9D:
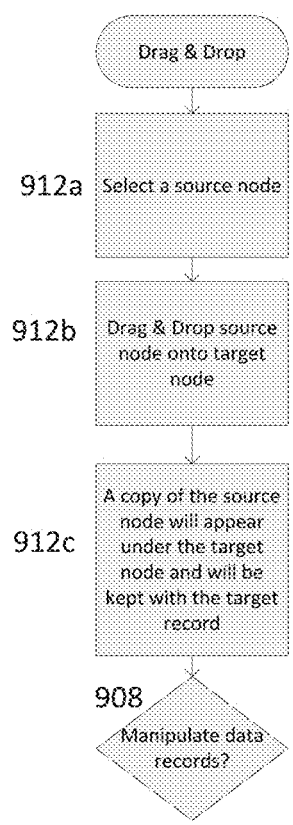
FIG. 9D illustrates a method of dragging and dropping using the user interface.

As shown in FIG. 9D, in step 912, the end user can drag and drop a source node into a target node. In step 912a, the end user selects a source node. In step 912b, the end user drags and drops the source onto a target node. In step 912c, a copy of the source node will appear under the target node and will be "kept" with the target record. After the end user is done dragging and dropping, the end user has the option to continue manipulating data records as is depicted by step 908.

Figure 9E:
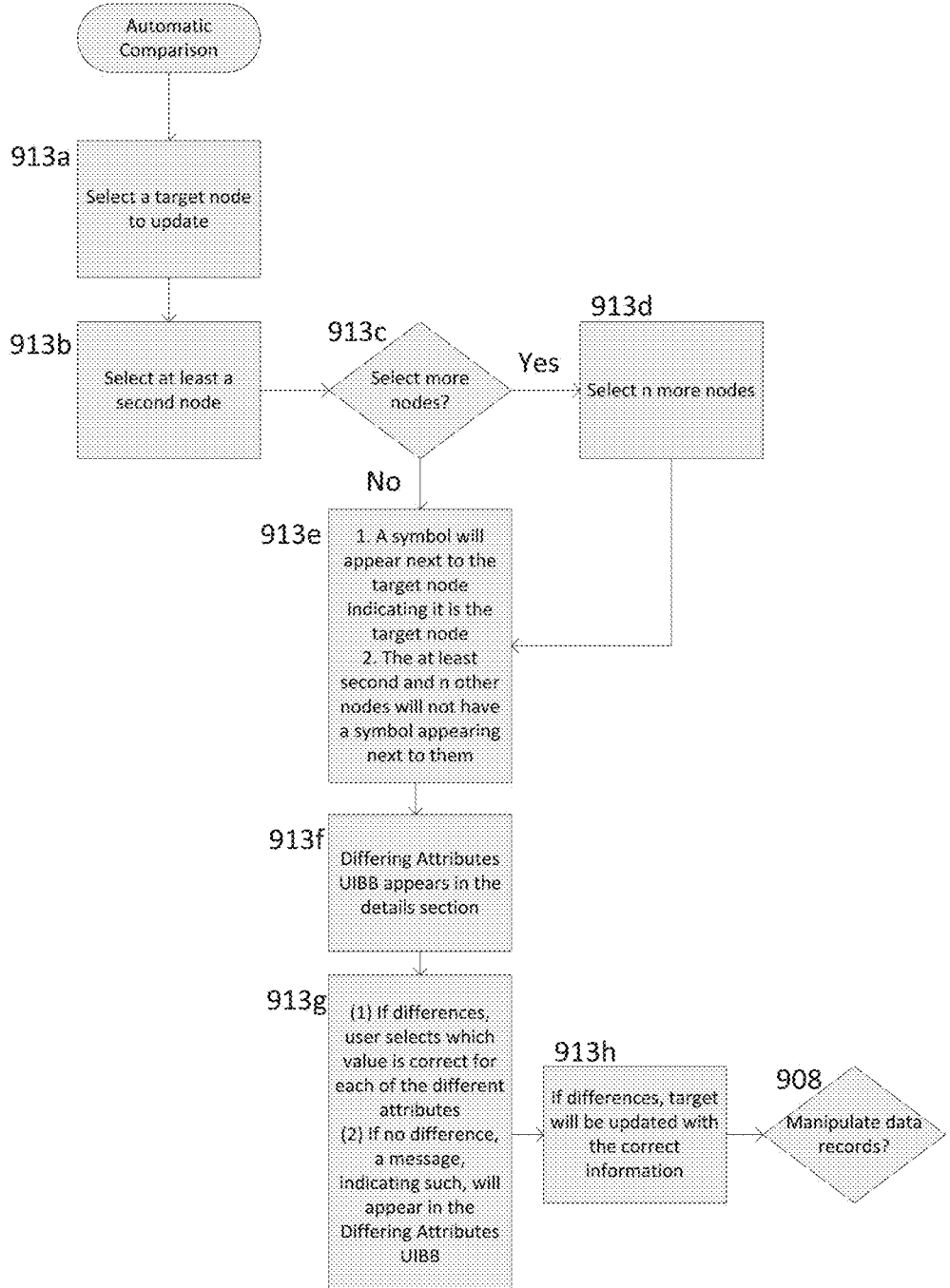
FIG. 9E illustrates a method of comparing and merging data associated with multiple nodes using the user interface.

As shown in FIG. 9E, in step 913, the end user can use the automatic comparison function to correct differing data between possible duplicative data associated with multiple nodes. In step 913a, the end user selects a first target node to update. In step 913b, the end user selects at least a second node to compare with the first node. At step 913c, the end user has the option to select more nodes (following the method above). At step 913e, when at least two nodes are selected a symbol appears next to the first node selected as an indicator of which node will be updated with the corrected information. In step 913f, a UIBB representing the differing attributes between the selected nodes or lack thereof appears in the details section 750. In step 913g, with the differing attributes UIBB, if there are differences, the end user is able to select which value is the correct value of the differing attributes. If there are no differences, a message, indicating such, will appear in the differing attributes UIBB. In an embodiment, the end user is able to select the correct value by selecting the appropriate checkbox located along each differing attribute as the correct value. In step 913h, the first node selected will be the node updated with the correct information from the differing attributes UIBB. After the end user is done using the automatic comparison functionality, the end user has the option to continue manipulating data records as is depicted by step 908.

Although the foregoing invention has been described in some detail for purposes of clarity of understanding, it will be apparent that certain changes and modifications may be practiced within the scope of the appended claims. The present invention may be practiced according to the claims without some or all of these specific details. For the purpose of clarity, technical material that is known in the technical fields related to the invention has not been described in detail so that the present invention is not unnecessarily obscured. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A computer-implemented method for de-duplicating data, within data records, with a graphical user interface application, the method comprising:
    selecting, with a processor forming part of at least one computing device, the data records to de-duplicate, wherein the data records to be de-duplicated include either (1) a target record or (2) the target record and at least one potential duplicate;
    forming, with the processor, a hierarchical representation of the data records, wherein the hierarchical representation appears in the graphical user interface application, wherein the hierarchical representation includes nodes representing data sets within either (1) the target record or (2) the target record and the at least one potential duplicate, wherein the individual nodes are selectable via a graphical user interface element associated with each node;
    presenting, on a display, the graphical user interface application;
    copying, with the graphical user interface application in response to user-generated input selecting at least one of the graphical user interface elements, nodes associated with the at least one potential duplicate to the target record;
    removing, with the graphical user interface application in response to user-generated input selecting at least one of the graphical user interface elements, nodes associated with the target record;
    editing, with the graphical user interface application in response to user-generated input selecting at least one of the graphical user interface elements, data associated with the at least one node of the hierarchical representation;
    performing, with the graphical user interface application, a comparing operation on at least two selected nodes of the hierarchical representation, wherein the comparing operation determines differences between the data associated with each of the at least two selected nodes of the hierarchical representation;
    forming, with the graphical user interface application, instructions based on at least one of (1) copying the nodes associated with the at least one potential duplicate to the target record, (2) removing the nodes associated with the target record, (3) editing the data associated with the at least one node of the hierarchical representation; and (4) performing the comparing operation on the at least two selected nodes of the hierarchical representation;
    applying, with the processor, the instructions to the target record.

2. The method of claim 1, wherein the hierarchical representation of the data records to de-duplicate is a data tree.

3. The method of claim 2, wherein the data tree includes parent, children and sibling nodes.

4. The method of claim 3, wherein the children nodes of the data tree can be moved underneath other parent nodes of the data tree.

5. The method of claim 4, further comprising: presenting a visual indicator next to a first selected node and a differing attributes interface depicting different attributes between two selected nodes and values of the attributes.

6. The method of claim 4, wherein the data records to be de-duplicated can be added or removed using the graphical user interface application.

7. The method of claim 4, wherein the target record and the at least one potential duplicate are selected using the graphical user interface application, wherein the target record is the only data record that will be modified by the instructions.

8. The method of claim 4, wherein one node can be dragged and dropped into another node using the graphical user interface application and in response to user-generated input.

9. The method of claim 1, wherein the data records to be de-duplicated are selected in a foreign graphical user interface application.

10. The method of claim 1, wherein the graphical user interface application is at least one of a web application and a web page.

11. The method of claim 9, wherein the foreign graphical user interface application is at least one of a web application and a web page.

12. The method of claim 1, wherein the data records to be de-duplicated are selected in an integrated design environment (IDE).

13. The method of claim 1, wherein the comparing operation is performed on at least three selected nodes of the hierarchical representation.

14. A non-transitory computer readable medium containing program instructions, wherein execution of the program instructions by one or more processors of at least one computer system causes one or more processors to perform operations comprising:
    selecting, with the processor, data records to de-duplicate, wherein the data records to be de-duplicated include either (1) a target record or (2) the target record and at least one potential duplicate;
    forming, with the processor, a hierarchical representation of the data records, wherein the hierarchical representation appears in a graphical user interface application, wherein the hierarchical representation includes nodes representing data sets within either (1) the target record or (2) the target record and the at least one potential duplicate, wherein the individual nodes are selectable via a graphical user interface element associated with each node;
    presenting, on a display, the graphical user interface application;
    copying, with the graphical user interface application in response to user-generated input selecting at least one of the graphical user interface elements, nodes associated with the at least one potential duplicate to the target record;
    removing, with the graphical user interface application in response to user-generated input selecting at least one of the graphical user interface elements, nodes associated with the target record;
    editing, with the graphical user interface application in response to user-generated input selecting at least one of the graphical user interface elements, data associated with the at least one node of the hierarchical representation;
    performing, with the graphical user interface application, a comparing operation on at least two selected nodes of the hierarchical representation, wherein the comparing operation determines differences between the data associated with each of the at least two selected nodes of the hierarchical representation;

forming, with the graphical user interface application, instructions based on at least one of (1) copying the nodes associated with the at least one potential duplicate to the target record, (2) removing the nodes associated with the target record, (3) editing the data associated with the at least one node of the hierarchical representation; and (4) performing the comparing operation on the at least two selected nodes of the hierarchical representation; applying, with the processor, the instructions to the target record.

15. The non-transitory computer readable medium of claim 14, wherein the hierarchical representation of the data records to de-duplicate is a data tree.

16. The non-transitory computer readable medium of claim 15, wherein the data tree consists of parent, children and sibling nodes.

17. The non-transitory computer readable medium of claim 16, wherein the children nodes of the data tree can be moved underneath other parent nodes of the data tree.

18. The non-transitory computer readable medium of claim 17, wherein the differences determined in the comparing operation are presented in the graphical user interface application.

19. The non-transitory computer readable medium of claim 17, wherein data records can be added or removed using the graphical user interface application.

20. The non-transitory computer readable medium of claim 17, wherein the target record and the at least one potential duplicate are selected using the graphical user interface application, wherein the target record is the only data record that will be modified by the instructions.

21. The non-transitory computer readable medium of claim 17, wherein one node can be dragged and dropped into another node using the graphical user interface application.

22. The non-transitory computer readable medium of claim 14, wherein the data records to be de-duplicated are selected in a foreign graphical user interface application.

23. The non-transitory computer readable medium of claim 14, wherein the graphical user interface application is at least one of a web application and a web page.

24. The non-transitory computer readable medium of claim 22, wherein the foreign graphical user interface application is at least one of a web application and a web page.

25. The non-transitory computer readable medium of claim 14, wherein the data records to be de-duplicated are selected in an integrated design environment (IDE).

26. The non-transitory computer readable medium of claim 14, wherein the comparing operation is performed on at least three selected nodes of the hierarchical representation.

27. A system directed to de-duplicating data within data records, the system comprising:
a database;
a display;
a processor, wherein the processor is configured to perform operations comprising:
selecting data records to de-duplicate, wherein the data records to be de-duplicated include either (1) a target record or (2) the target record and at least one potential duplicate;
forming a hierarchical representation of the data records, wherein the hierarchical representation appears in a graphical user interface application, wherein the hierarchical representation includes nodes representing data sets within either (1) the target record or (2) the target record and the at least one potential duplicate, wherein the individual nodes are selectable via a graphical user interface element associated with each node;

presenting, on a display, the graphical user interface application;

copying, with the graphical user interface application in response to user-generated input selecting at least one of the graphical user interface elements, nodes associated with the at least one potential duplicate to the target record;

removing, with the graphical user interface application in response to user-generated input selecting at least one of the graphical user interface elements, nodes associated with the target record;

editing, with the graphical user interface application in response to user-generated input selecting at least one of the graphical user interface elements, data associated with the at least one node of the hierarchical representation;

performing, with the graphical user interface application, a comparing operation on at least two selected nodes of the hierarchical representation, wherein the comparing operation determines differences between the data associated with each of the at least two selected nodes of the hierarchical representation;

forming, with the graphical user interface application, instructions based on at least one of (1) copying the nodes associated with the at least one potential duplicate to the target record, (2) removing the nodes associated with the target record, (3) editing the data associated with the at least one node of the hierarchical representation; and (4) performing the comparing operation on the at least two selected nodes of the hierarchical representation; applying the instructions to the data records.

28. The system of claim 27, wherein the hierarchical representation of the data records to de-duplicate is a data tree.

29. The system of claim 28, wherein the data tree consists of parent, children and sibling nodes.

30. The system of claim 29, wherein the children nodes of the data tree can be moved underneath other parent nodes of the data tree.

31. The system of claim 30, wherein the differences determined in the comparing operation are presented in the graphical user interface application.

32. The system of claim 30, wherein data records can be added or removed using the graphical user interface application.

33. The system of claim 30, wherein the target record and the at least one potential duplicate are selected using the graphical user interface application, wherein the target record is the only data record that will be modified by the instructions.

34. The system of claim 30, wherein one node can be dragged and dropped into another node using the graphical user interface application.

35. The system of claim 27, wherein the data records to be de-duplicated are selected in a foreign graphical user interface application.

36. The system of claim 27, wherein the graphical user interface application is at least one of a web application and a web page.

37. The system of claim 35, wherein the foreign graphical user interface application is at least one of a web application and a web page.

38. The system of claim 27, wherein the data records to be de-duplicated are selected in an integrated design environment (IDE).

39. The system of claim 27, wherein the comparing operation is performed on at least three selected nodes of the hierarchical representation.

40. The system of claim 27, wherein the data records selected to be de-duplicated are stored in the database.

41. The system of claim 40, wherein the instructions are applied to the data records in the database.

* * * * *